United States Patent

Oelgaard et al.

(10) Patent No.: US 7,636,352 B2
(45) Date of Patent: Dec. 22, 2009

(54) MAINTAINING FILTERING DATABASE CONSISTENCY

(75) Inventors: Torkil Oelgaard, Copenhagen (DK);
Joergen P. R. Hofman-Bang, Copenhagen (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 195 days.

(21) Appl. No.: 11/508,361

(22) Filed: Aug. 22, 2006

(65) Prior Publication Data

US 2008/0049612 A1    Feb. 28, 2008

(51) Int. Cl.
*H04L 12/28* (2006.01)
*H04L 12/56* (2006.01)

(52) U.S. Cl. .................. 370/389; 370/392; 370/400

(58) Field of Classification Search .......... None
See application file for complete search history.

(56) References Cited

U.S. PATENT DOCUMENTS

| | | | |
|---|---|---|---|
| 5,136,580 | A | 8/1992 | Videlock et al. |
| 5,309,437 | A | 5/1994 | Perlman et al. |
| 5,343,471 | A | 8/1994 | Cassagnol |
| 5,396,493 | A | 3/1995 | Sugiyama |
| 5,477,547 | A | 12/1995 | Sugiyama |
| 5,909,686 | A | 6/1999 | Muller et al. |
| 5,959,976 | A | 9/1999 | Kuo |
| 6,757,279 | B1 * | 6/2004 | Furlong et al. ............ 370/387 |
| 6,813,268 | B1 | 11/2004 | Kalkunte et al. |
| 6,952,421 | B1 | 10/2005 | Slater |
| 6,993,033 | B1 | 1/2006 | Williams |
| 6,999,455 | B2 | 2/2006 | Sampath et al. |
| 7,106,736 | B2 | 9/2006 | Kalkunte |
| 7,123,615 | B2 | 10/2006 | Weyman et al. |
| 7,139,267 | B2 | 11/2006 | Lu et al. |
| 7,184,441 | B1 | 2/2007 | Kadambi et al. |
| 2002/0009081 | A1 | 1/2002 | Sampath et al. |
| 2002/0124107 | A1 | 9/2002 | Goodwin |
| 2003/0179707 | A1 * | 9/2003 | Bare .................... 370/235 |
| 2005/0147111 | A1 * | 7/2005 | Moleyar et al. ........... 370/412 |
| 2005/0271044 | A1 | 12/2005 | Hsu et al. |
| 2006/0092853 | A1 | 5/2006 | Santoso et al. |
| 2007/0268915 | A1 * | 11/2007 | Zelig et al. .............. 370/401 |

\* cited by examiner

*Primary Examiner*—Hong Cho
*Assistant Examiner*—Robert C Scheibel
(74) *Attorney, Agent, or Firm*—Klein, O'Neill & Singh, LLP

(57) ABSTRACT

Information is shared between switches such as bridges to facilitate efficient forwarding of data. In some embodiments consistency is maintained between information stored in filtering databases for IEEE 802.1D or 802.1Q bridges. When a switch does not have an entry in a filtering database that matches a destination address in a received frame, the switch may send information with the forwarded frame indicating that the switch had no entry for the destination address. When a switch that has an entry for a given destination address receives a frame along with an indication that the sender did not have an entry or has a different entry for the destination address, the switch may send its information corresponding to the destination address to other switches.

7 Claims, 5 Drawing Sheets

MAINTAINING FILTERING DATABASE CONSISTENCY

TECHNICAL FIELD

This application relates to data communications and, more specifically, to switching components.

BACKGROUND

Data networks include various infrastructure components for sending data between distributed computing devices. For example, a network may consist of interconnected nodes having switching components such as bridges and routers that send data from one node to another. The node components maintain information to facilitate sending data to a given destination.

The IEEE 802.1D specification defines a standard for bridges. Briefly, a bridge may operate on MAC layer information to forward data to other switching components. Here, a bridge may maintain a database that indicates where data bound for certain destinations should be forwarded. For example, the database may indicate that the data should be forwarded to a specific port. In the event there is an entry in the database for that destination, the bridge forwards the data accordingly. In the event the database does not include an entry that indicates where data bound for a certain destination should be forwarded, the bridge may send the data to every node to which the bridge is connected. This process may be repeated at these nodes until the data is eventually sent to a node that has information regarding how the data is to be forwarded to the destination.

Several bridges may be connected together to form a combination that is commonly referred to as a "stack." The combination appears, for the most part, as a single bridge to external components. For example, a host or an external switch may communicate with the stack as if the stack is a single bridge. The bridges within a stack may share information from their respective databases. As an example, a given bridge may distribute information about learned MAC addresses to other bridges in the stack.

Conventionally, software-based solutions have been used to manage information regarding learned MAC addresses within a stack. As a result, bridge designs have had to dedicate significant CPU resources and support relatively complex software to handle the learning and distribution of the MAC addresses.

SUMMARY

A summary of various aspects and/or embodiments of a system constructed or a method practiced according to the invention follows. For convenience, an embodiment of a system constructed or a method practiced according to the invention may be referred to herein simply as an "embodiment."

The invention relates in one aspect to a system and method for maintaining data forwarding information in switches such as bridges. For example, techniques are disclosed for maintaining consistency between information in filtering databases for IEEE 802.1D and 802.1Q bridges.

In some embodiments, when a switch forwards a data frame the switch also forwards information relating to a forwarding decision for the frame. For example, when a switch does not have an entry in a filtering database that matches a destination address in a received frame, the switch may send information with the frame indicating that the switch had no entry for the destination address. Alternatively, when a switch does have an entry in a filtering database that matches a destination address in a received frame, the switch may send information from its filtering database (e.g., information relating to a corresponding destination port) along with the frame.

In some embodiments, when a switch receives information relating to a forwarding decision for a frame, the switch uses the information in conjunction with the distribution of forwarding information from an associated database. For example, when a switch has an entry in a filtering database for a given destination address for a received frame and the frame is accompanied by an indication that the sender does not have an entry or has a different entry for the destination address in its filtering database, the switch may send its destination information (e.g., a corresponding destination port) to other switches.

In some embodiments data forwarding information is maintained between bridges in a stack. For example, a bridge that has information about a given destination port for a given destination address may distribute this information to other bridges in the stack. In this way, consistency may be maintained between all of the filtering databases in the stack.

BRIEF DESCRIPTION OF THE DRAWINGS

These and other features, aspects and advantages of the invention will be more fully understood when considered with respect to the following detailed description, appended claims and accompanying drawings, wherein:

Figure 1:
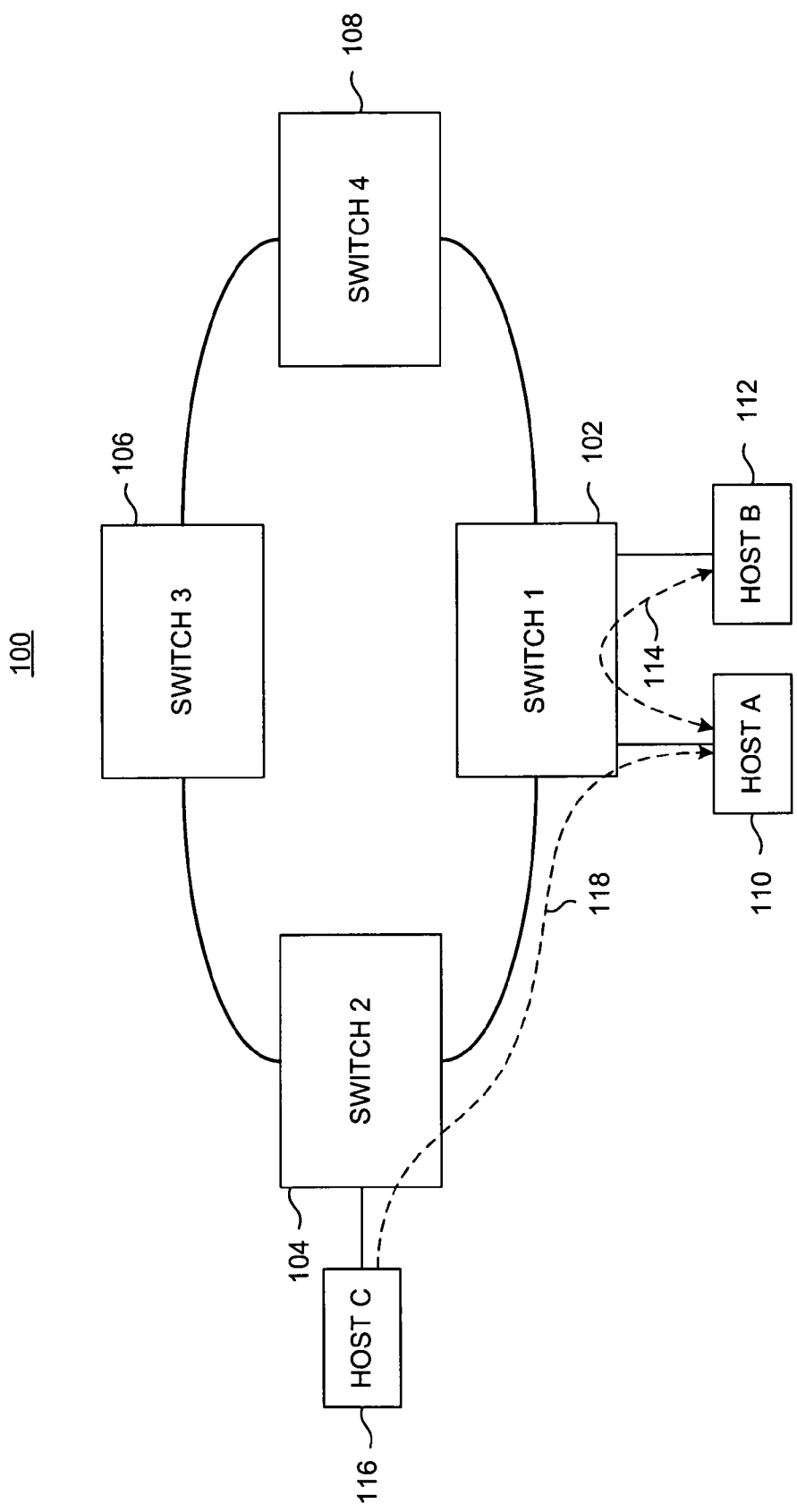
FIG. 1 is a simplified diagram of one embodiment of a switch stack.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Aspects of the invention are described below, with reference to detailed illustrative embodiments. It will be apparent that the invention may be embodied in a wide variety of forms, some of which may appear to be quite different from those of the disclosed embodiments. Consequently, the specific structural and/or functional details disclosed herein are merely representative and do not limit the scope of the invention. For example, based on the teachings herein one skilled in the art should appreciate that the various structural and/or functional details disclosed herein may be incorporated in an embodiment independently of any other structural and/or functional details. Thus, a system may be implemented and/or a method practiced using any number of the structural and/or functional details set forth in any of the disclosed embodiment(s). Also, a system may be implemented and/or a method practiced using other structural and/or functional details in addition to or other than the structural and/or functional details set forth in any disclosed embodiment(s). Accordingly, references to "an" or "one" embodiment in this discussion are not necessarily to the same embodiment, and such references mean at least one embodiment.

The discussion that follows refers to various switches and switch stacks. It should be appreciated that the teachings herein are not limited to switches. Rather the teachings herein also may be applicable to other data forwarding components. For convenience, such a component may be referred to herein simply as a switch. Thus, a switch may refer to, without limitation, an Ethernet bridge, an Ethernet switch, a MAC bridge, an IEEE 802.1D bridge or an IEEE 802.1Q bridge.

In general, an Ethernet bridge is a device that interconnects individual IEEE 802 LANs and forwards frames between the individual LANs based on destination address information in the frames. Through observation of source address information of received frames on each port, Ethernet bridges may update their forwarding database. Under IEEE 802.1D, this learning relates to learned MAC addresses. Under IEEE 802.1Q, learning is based on MAC addresses and virtual LAN identifiers. IEEE 802.1Q allows mapping of multiple virtual LANs into one filtering identifier (FID). Each virtual LAN may thus represent a separate MAC address space. For convenience, the following may simply refer to IEEE 802.1D and to MAC addresses. It should be appreciated, however, that the concepts discussed below may be equally applicable to IEEE 802.1Q. Accordingly, the references to 802.1D should be understood as also possibly referring to 802.1Q. In addition, the references to a MAC address should be understood as also possibly referring to the combination of a MAC address and a virtual LAN identifier.

A switch stack is a combination of switches that appear, for the most part, as a single switch to external components. To this end, switches within a switch stack are configured to share information from their respective filtering databases. For example, the switches in a switch stack attempt to share information regarding learned MAC addresses with one other.

In one aspect, the teachings herein may be used to facilitate implementing filtering database synchronization in hardware with minimal or no CPU involvement. It should be appreciated, however, that these teachings are not limited to hardware implementations.

One potential problem associated with a hardware-based distribution of information for filtering databases is that a given MAC address may be "lost" in one switch, while still being present in the filtering database of other switches. A MAC address may be lost from a database due to, for example, aging or MAC table resource constraints. When a switch receives a frame destined for a MAC address that is not in its filtering database, the switch may forward the frame to all connected switches. This is conventionally referred to as flooding the frame. Flooding frames substantially increases the load on the network.

Referring to FIG. 1, the above problem will be further illustrated in conjunction with the example switching system 100 including switches 102, 104, 106 and 108 (designated switches 1, 2, 3 and 4, respectively). A pair of hosts 110 and 112 (designated hosts A and B, respectively) regularly communicate with one another as represented by a dashed line 114. Hosts A and B are assigned MAC address MA and MB, respectively. When host A needs to send data to host B, host A generates a frame including the data, a source MAC address (MA) and a destination MAC address (MB). Host A sends the frame to switch 1. Switch 1 reads the destination MAC address in the frame and sends the frame to host B. A similar process is followed when host B sends data to host A. The filtering database for switch 1 will thus contain entries for MA and MB. Moreover, these entries will not get "aged" because switch 1 regularly receives frames with MA and MB as source addresses due to the frequent bi-directional frame flow between hosts A and B. In other words, because the entries for MA and MB are frequently refreshed in the filtering database for switch 1, the entries will not be removed from (e.g., "aged" out of) the filtering database.

Another host 116 (designated host C) occasionally communicates with host A. Host C is assigned MAC address MC. As represented by a dashed line 118, the communication between hosts A and C is primarily unidirectional from host C to host A. Here, when host C needs to send data to host A, host C generates a frame including the data, a source MAC address (MC) and a destination MAC address (MA). Host C sends the frame to switch 2. Switch 2 reads the destination MAC address in the frame and ideally, based on an entry in its filtering database, would send the frame to switch 1 via an appropriate port. Switch 1 would then read the destination MAC address in the frame and sends the frame to host A. However, due to the primarily unidirectional flow of the frames, switch 2 may "age" the entry for MA in its filtering database because switch 2 may not receive frames with MA as the source address for a long period of time. If switch 2 "ages" the MA entry or loses the entry for other reasons, switch 2 will not know that frames destined for host A should be sent to switch 1. Consequently, switch 2 will flood any traffic from host C destined for host A on all ports on switch 2. Thus, switch 2 will send the frame over the link connecting switch 2 to switch 1, the link connecting switch 2 to switch 3, and potentially any other links (not shown) connected to switch 2. Switch 1 will eventually receive the frame destined for host A and, since it has an entry for MA in its database, will directly forward the frame to host A.

In some embodiments, the problem of a "lost" MAC address is resolved by providing a mechanism that enables switch 1 to determine that switch 2 no longer has information about the MAC address (e.g., MA). Once switch 1 makes this determination, switch 1 may distribute the MAC address information to switch 2.

In some embodiments the above mechanism involves configuring a switch so that once it determines that a given destination MAC address is unknown the switch will generate a corresponding indication and forward that indication to other switches. For example, when a switch receives a frame, the switch conducts a lookup in its filtering database for the destination MAC address associated with the received frame. If a corresponding entry is not found, the switch may generate information indicating that the destination MAC address was unknown. The switch then associates that information with the frame and forwards frame along with the information to other switches in the switch stack. The other switches are thereby provided with an indication that the destination MAC address was unknown in the switch that forwarded the frame.

When another switch receives the forwarded frame and the associated information, that switch may use the receipt of the received associated information to trigger distribution of information from its database that corresponds to the destination MAC address. An example of such a process follows. Initially, the recipient switch receives a frame along with the associated information. The recipient switch then conducts a lookup in its filtering database for the destination MAC address of the received frame. In the event the recipient switch has a match in its filtering database for the destination MAC address, the recipient switch may generate a new frame including the destination MAC address at issue and the corresponding information from the filtering database. The recipient switch then sends the new frame to the switch that forwarded the frame. Upon receipt of the new frame, that switch may update its filtering database.

Figure 2:
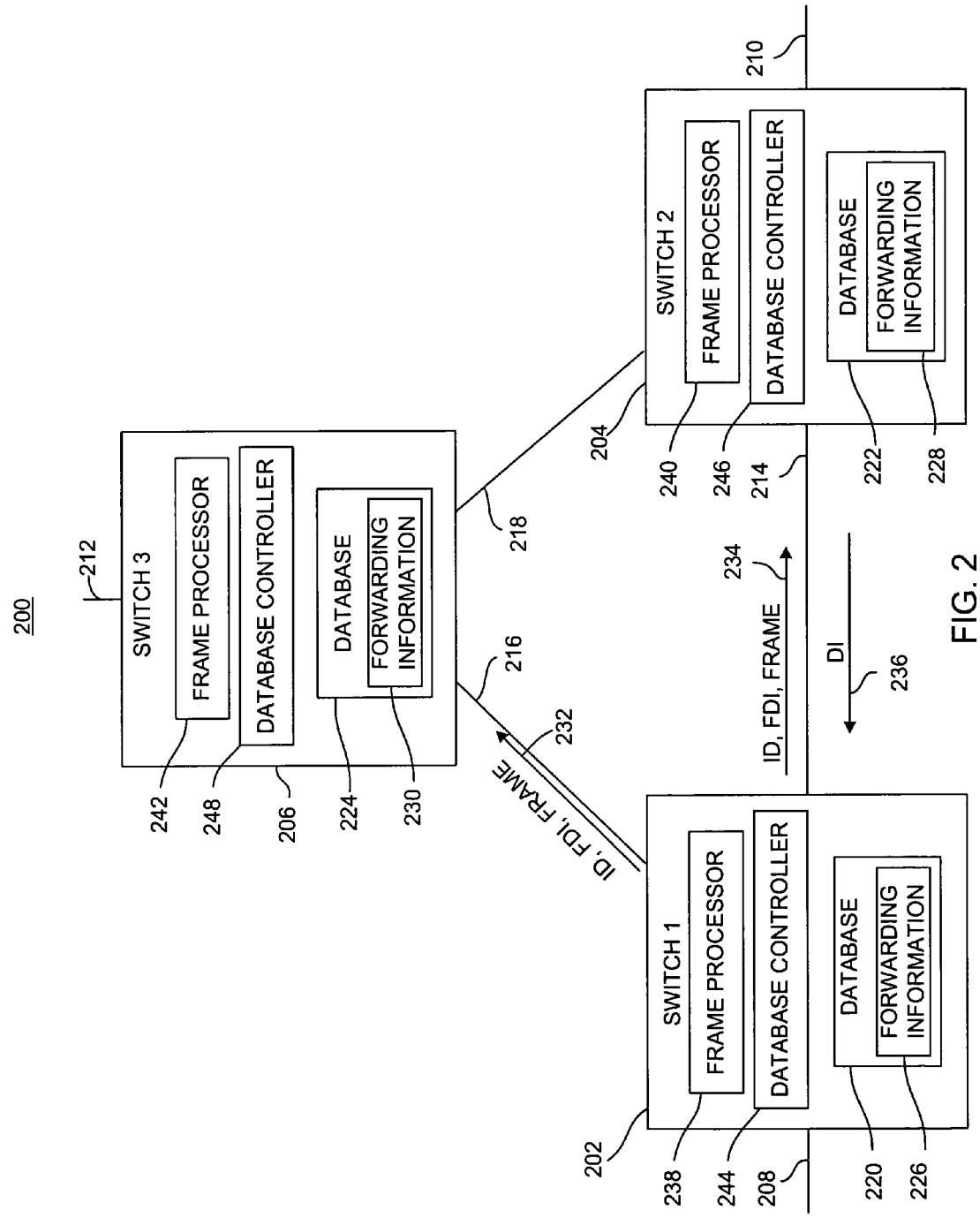
FIG. 2 is a simplified diagram of one embodiment of a switch stack constructed in accordance with the invention.

FIG. 2 illustrates one embodiment of a switching system 200 that incorporates features to maintain consistency between filtering databases. The system includes switches (e.g., bridges) 202, 204 and 206 that may communicate with other components (not shown) via links 208, 210, 212 and with each other via links 214, 216 and 218. For example, switch 202 and switch 204 may communicate with one another via link 214. Switch 202 and switch 206 may communicate with one another via link 216. Switch 204 and switch 206 may communicate with one another via link 218. In some embodiments, the system 200 may comprise a switch stack. Thus, the switches 202, 204 and 206 attempt to share information relating to learned MAC addresses. For illustrative purposes, three switches are shown with representative interconnection links 214, 216 and 218. It should be appreciated that the teachings herein may be applicable to other switching configurations, systems with a different number of switches and a different manner of interconnection.

Each switch 202, 204 and 206 is associated with a corresponding database 220, 222 and 224, respectively, such as a filtering database. In practice, a database may be incorporated into a switch as shown in FIG. 2 or may be external to a switch. The databases 220, 222 and 224 are configured to store forwarding information 226, 228 and 230, respectively, that the switch associated with the database may access to determine how to forward a received frame.

For example, when the switch 202 receives a frame on a port connected to the link 208, the switch 202 searches the forwarding information 226 in the database 220 to determine whether there is an entry that matches the destination MAC address of the received frame. If there is a matching entry, the switch 202 may forward the frame in accordance with destination information (e.g., a specified destination port) in the database entry. For example, the destination information may specify that the frame is to be forwarded via a port connected to link 214. If there is no matching entry, the switch 202 may flood the frame. For example, the switch 202 may forward the frame via ports connected to links 214, 216 and any other ports (not shown) of the switch 202.

Figure 3:
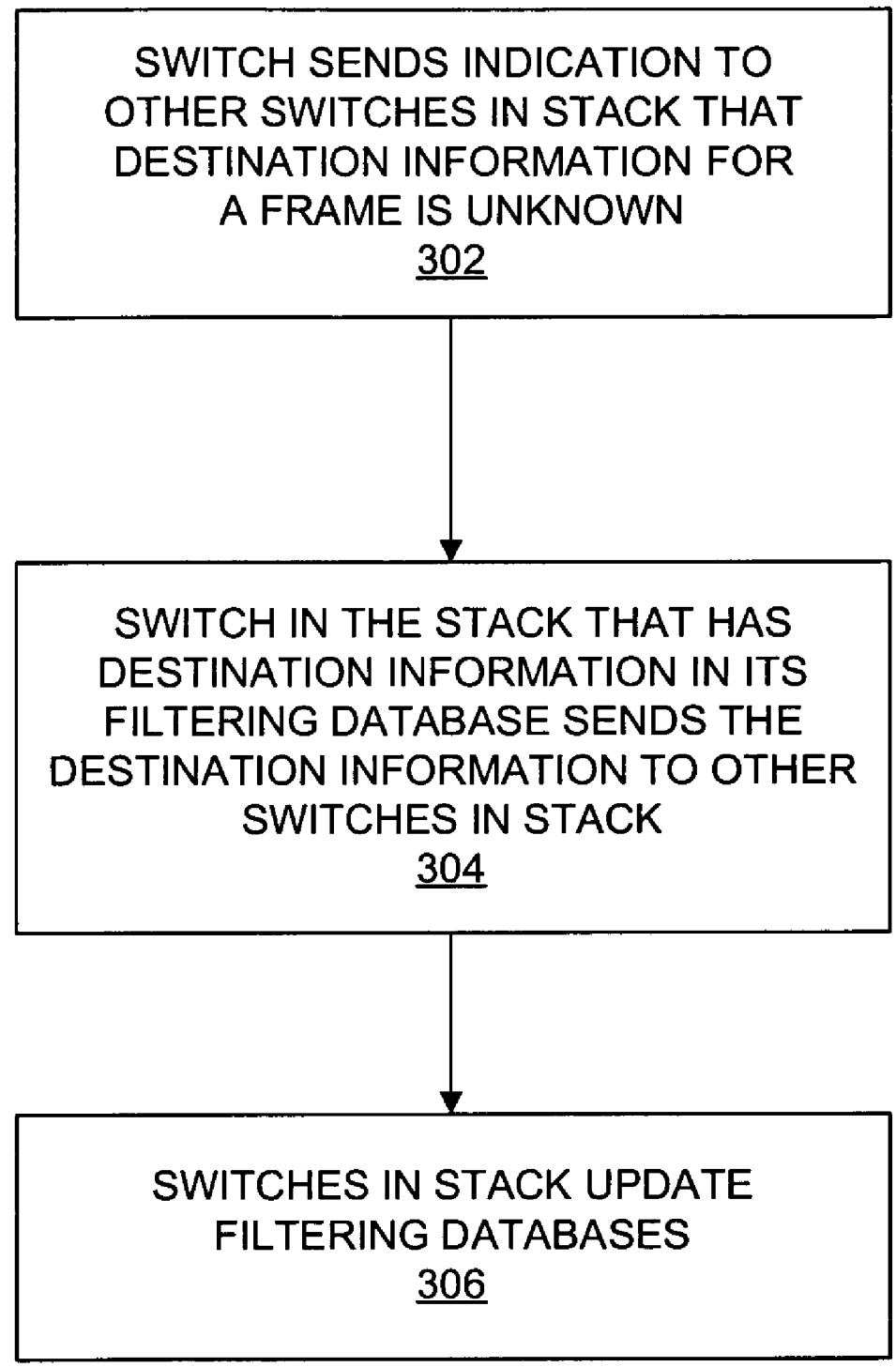
FIG. 3 is a flow chart of one embodiment of operations that may be performed in accordance with the invention.

The system of FIG. 2 may be configured to maintain consistency and/or synchronization between the filtering databases in accordance with the teachings herein. One embodiment of a process for maintaining consistency and/or synchronization between databases includes: sending an indication that destination information for a frame is not present in a database; receiving the indication; sending, in response to the received indication, the destination information; receiving the sent destination information; and updating the database (and, optionally, one or more other databases) in accordance with the received destination information. FIG. 3 illustrates one embodiment of corresponding operations that may be performed by a system such as the system 200 of FIG. 2. It should be appreciated, however, that the operations set forth below or similar operations may be performed by other types of systems or components.

As represented by block 302, when a switch (e.g., switch 202) in the switch stack determines that it does not have an entry in its database (e.g., database 220) corresponding to the destination MAC address for a received frame, the switch sends a corresponding indication to the other switches (e.g., switches 204 and 206) in the switch stack. Typically, the indication is forwarded in conjunction with forwarding of the frame. For example, in some embodiments the indication is incorporated into a header that is attached to the forwarded frame. It should be appreciated that the indication may be sent at other times and via other mechanisms.

In the example shown in FIG. 2, the switch 202 forwards the indication and the frame to switches 206 and 204 as represented by arrows 232 and 234, respectively. Here, the indication may be considered as one type of forwarding decision information ("FDI"). For example, the lack of a match in the database 220 corresponding to the destination MAC address of the received frame led to a forwarding decision by switch 202 to flood the frame to switches 204 and 206. Accordingly, the designations FDI and FRAME associated with arrows 232 and 234 represent that forwarding decision information may be forwarded in conjunction with the frame.

As represented by block 304, when a switch (e.g., switch 204) in the switch stack receives a forwarded frame, the switch searches for an entry in its database (e.g., database 222) corresponding to the destination address of the received frame. If that switch does have an entry (e.g., identifying a destination port) for the frame, the switch determines whether it received information about the forwarding decision made by a switch that previously forwarded the frame. For example, the switch may receive an indication that a switch (e.g., switch 202) that previously forwarded the frame does not have an entry for that destination address. Alternatively, the switch may receive information (e.g., port information) that a preceding switch used to forward that frame. In either case, if such information was received the switch may use this information to trigger distribution of selected information in its filtering database to other switches in the switch stack. For example, if the received information indicates that the preceding switch or switches did not have a corresponding database entry or had a different database entry for the destination MAC address, the switch may send destination information from its database to one or more of the switches in the stack. An example where the destination information ("DI") is only sent to switch 202 is represented by arrow 236 in FIG. 2.

The destination information sent to the other switch(es) may include a reference that enables a recipient switch to associate the destination information with a given destination MAC address. In some embodiments the switch may generate a new frame with that MAC address as the source address and frame data containing the destination information as well as an indication that the frame is only for learning purposes. This new frame may be sent to all switches in the stack. In other embodiments, the destination information may not be included explicitly in the new frame, but instead be deduced by the recipient switch. For example, the recipient switch may determine the destination information based on the port upon which the recipient switch received the new frame.

As represented by block 306, each switch that receives the destination information may update its database. For example, the switch 202 may generate a forwarding information entry 226 in database 220 that includes the destination MAC address associated with the frame and the destination information provided by switch 204.

The destination information may take various forms. For example, the destination information may identify a destination port or may identify one or more paths (e.g. a preferred path and an alternate path). In addition, the destination information may comprise information that a recipient switch may use to ultimately obtain forwarding information. The destination information also may be deduced by the recipient switch based on the port upon which the recipient switch receives the frame.

Figure 4:
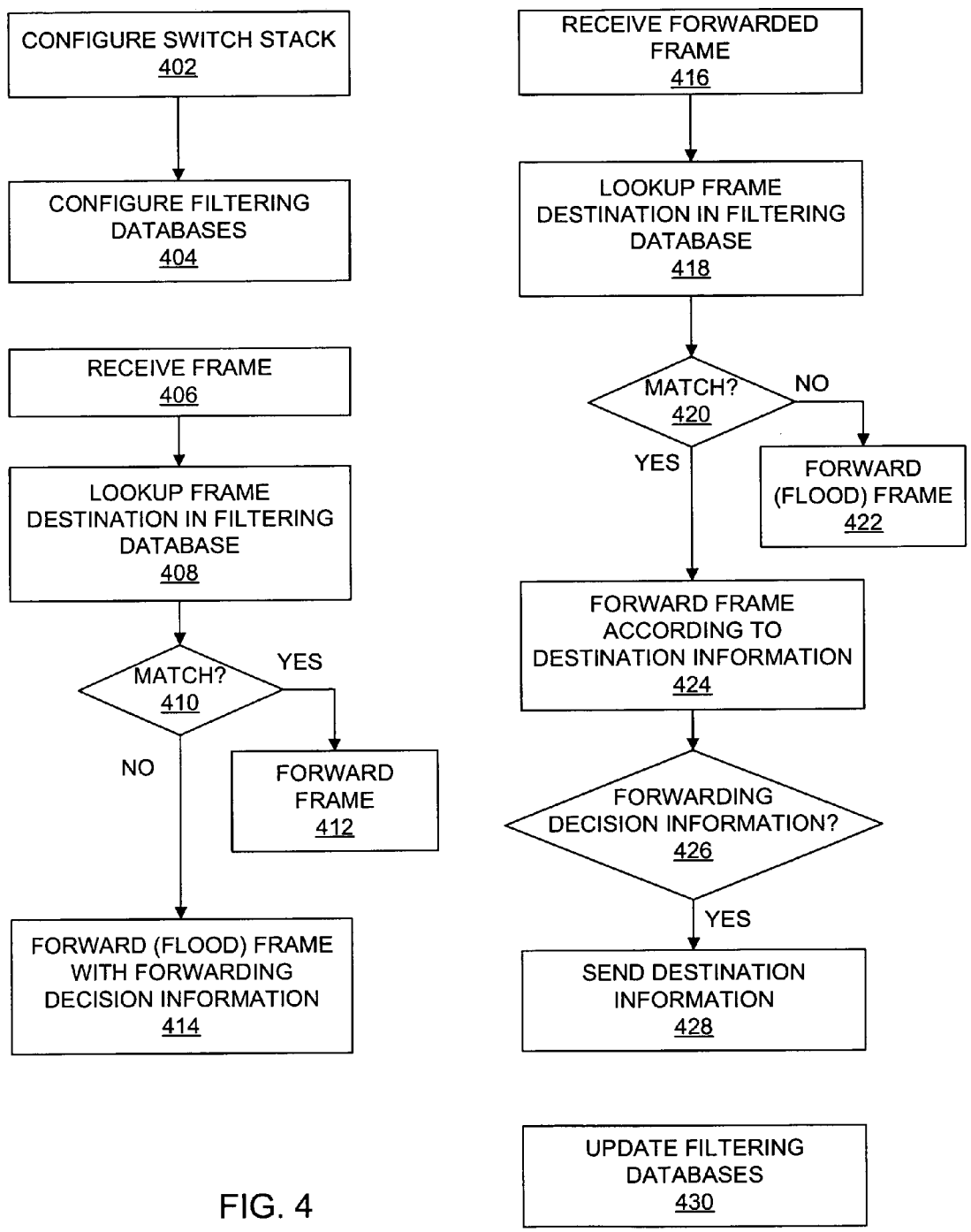
FIG. 4 is a flow chart of one embodiment of operations that may be performed in accordance with the invention.
Figure 5:
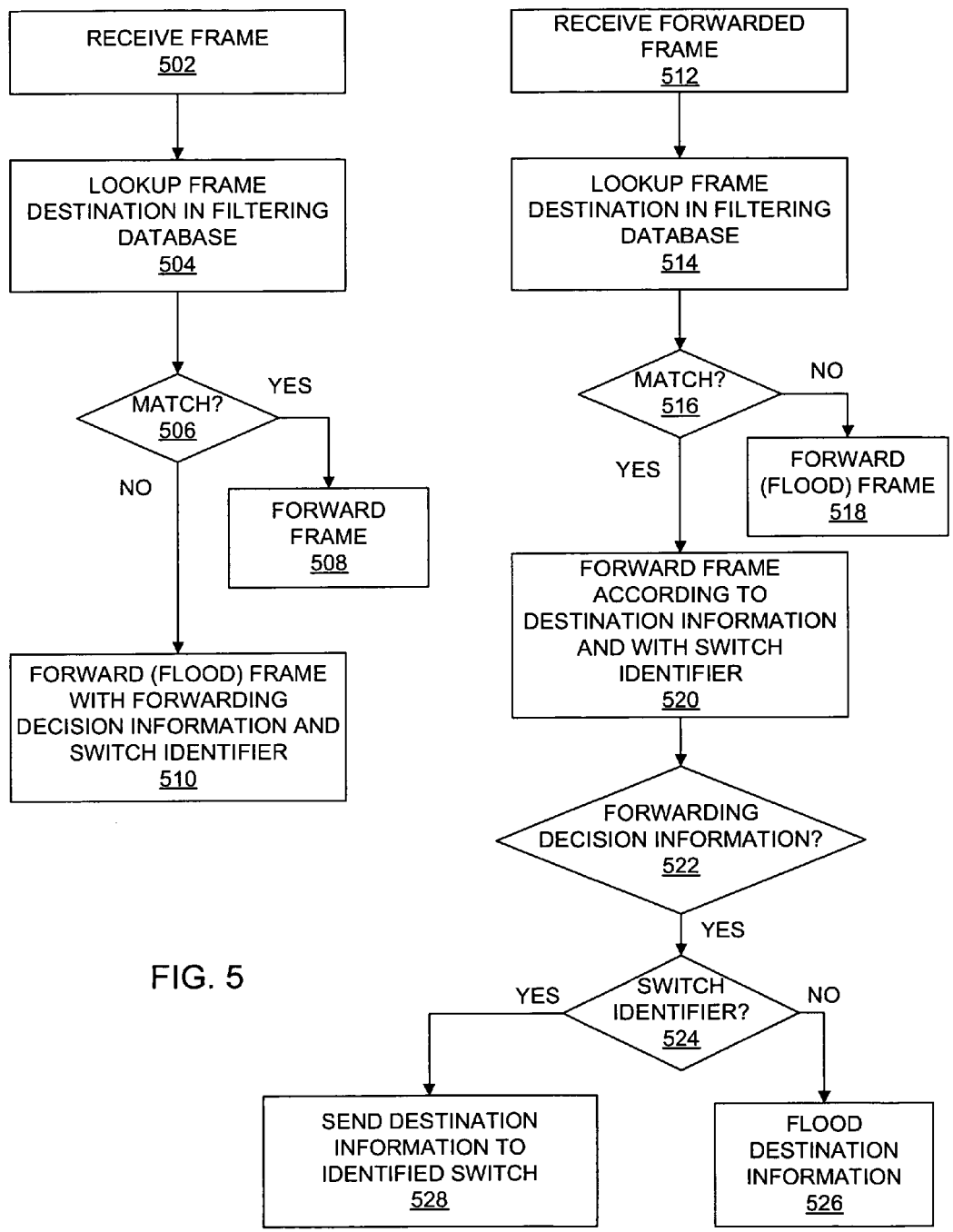
FIG. 5 is a flow chart of one embodiment of operations that may be performed in accordance with the invention.

Referring now to FIGS. 4 and 5, several examples of additional operations that may be used to forward data and maintain database consistency will be considered. FIG. 4 illustrates one embodiment of several stages of a process including configuring a system, forwarding data and updating the databases. FIG. 5 illustrates an embodiment that utilizes switch identifiers to facilitate the updating of the databases. It should be appreciated that the operations set forth below or similar operations may be performed by types of systems or components other than those specifically mentioned.

Blocks 402 and 404 in FIG. 4 relate to operations that may be performed to configure the system to begin receiving and forwarding frames. In some embodiments the system may be configured as a switch stack (block 402). For example, several 802.1D bridges may be interconnected and configured such that the switch stack appears (or substantially appears) as a single 802.1D bridge to components (e.g., network components such as switches, routers, hosts, etc.) that interact with the switch stack. Accordingly, the 802.1D bridges in the stack attempt to share information regarding learned MAC addresses.

As represented by block 404, filtering databases associated with the switches are configured. In some embodiments a database may be initially configured by manually placing one or more entries in the database. In some embodiments some or all of the entries may be automatically acquired by a learning algorithm or other technique. For example, information for destination MAC addresses may be learned by observing information associated with source MAC addresses of received frames. More specifically, the destination port for a given destination MAC address may be learned by observing the port upon which a frame having a corresponding source MAC address was received. In addition, as discussed above, learning under IEEE 802.1Q may be based on MAC addresses and virtual LAN identifiers.

Blocks 406-414 represent operations that may be performed by a switch when forwarding a frame. As represented by block 406, initially a switch (e.g., switch 202) receives one or more frames directed to a given destination. Here, the frame(s) may include destination address information such as a destination MAC address.

Each switch includes appropriate hardware (and optionally software) to process frames. For example, in some embodiments each switch includes a frame processor (e.g., frame processors 238, 240 and 242). A frame processor may be configured, for example, to receive, process and forward one or more frames. The processing of frames may include, for example, extracting information from the frames, adding information to the frames, reformatting the frames, and generating and adding headers or other fields to the frames. A frame processor may be implemented in various ways depending on the requirements of the system. In some embodiments the frame processor may comprise dedicated hardware (e.g., state machines). In some embodiments the frame processor may comprise one or more processors that execute code. Such a processor also may perform other tasks for the switch.

Each switch also includes appropriate hardware (and optionally software) to manage its associated database(s). For example, in some embodiments each switch includes a database controller (e.g., database controllers 244, 246 and 248). A database controller may be configured, for example, to search for entries in a database, add entries to the database, update entries in the database, and generate information (e.g., indicators) based on the entries in the database. A database controller may be implemented in various ways depending on the requirements of the system. In some embodiments the database controller may comprise dedicated hardware (e.g., state machines). In some embodiments the database controller may comprise one or more processors that execute code. Again, such a processor also may perform other tasks for the switch.

As represented by block 408, after identifying the destination address of the frame, the switch performs a lookup of its filtering database. The database controller thus determines whether the database contains an entry that matches the destination address (block 410). If there is a match (block 412), the switch forwards the frame in accordance with the corresponding destination information from the database entry.

In some embodiments, the database manager may generate forwarding decision information comprising, for example, the destination information. Here, the destination information may be used to indicate to other switches how this switch expects the corresponding frame to be forwarded. As discussed in more detail below, the other switches may use this information to maintain consistency among the filtering databases. In some embodiments the switch may forward the forwarding decision information with the frame. For example, the frame processor may append this information to the frame via a new or existing header.

The destination information may comprise, for example, an identification of the corresponding destination port to the frame. In some cases this may identify a port on another switch in the switch stack.

If there is no match at block 410, the switch may forward the received frame along with forwarding decision information that indicates that there was no match in the database for this switch. Here, the database manager may generate the forwarding decision based on the information that there was no match in the database lookup. The frame processor may then forward the forwarding decision information with the frame (e.g., by inserting the information in the frame). Typically, the frame processor will flood the frame in an attempt to send the frame to a switch or other network component that may eventually forward the frame to the desired destination. It should be appreciated that other forwarding schemes also may be employed to this end.

Blocks 416-428 represent operations that may be performed by a switch when forwarding a frame that was previously forwarded by one or more switches in the switch stack. As represented by blocks 416, 418 and 420, the switch (e.g., switch 204 including frame processor 240 and database manager 246) receives the frame and performs a lookup of its database (e.g., database 222) to determine whether the database includes an entry that matches the destination address of the frame. These operations may be similar to those discussed above in conjunction with blocks 406, 408 and 410.

If there is no match (block 422), the switch may forward (e.g., flood) the frame in an attempt to send the frame to a switch or other network component that may eventually forward the frame to the desired destination. The switch also may forward any associated information (e.g., forwarding decision information) that was received in conjunction with the frame.

If there is a match (block 424), the switch forwards the frame in accordance with the corresponding information (e.g., destination information) from the database entry. In addition, the frame processor may determine whether any associated information (e.g., forwarding decision information) from one or more switches was received in conjunction with the frame (block 426). If so, the frame processor also may forward the associated information (e.g., in a header or via some other mechanism).

As represented by block 428, depending on the forwarding decision information, the switch may send information from its database to one or more of the other switches in the switch stack. For example, the switch may retrieve destination information (e.g., from a database in the switch or external to the switch) and send the destination information to one or more other switches if the forwarding decision information indicates that one or more switches that previously forwarded the frame do not have a database entry for the destination address of the frame.

Alternatively, the switch (the current switch) may send out its destination information if the forwarding decision information indicates that one or more switches that previously forwarded the frame (the previous switch) have a different database entry associated the destination address of the frame. As discussed above in conjunction with block 412, a switch (the previous switch) may send forwarding decision information comprising destination information along with the frame. However, the previous switch may have a given port listed as the destination port in its database while the entry in the database of the current switch lists a different port. Accordingly, the current switch may send its information to the previous switch to correct the entry in the database of the previous switch.

In response to either type of forwarding decision information, the database controller may provide the information from the database to the frame processor. The frame processor may then, for example, incorporate the destination information into a frame or header, to facilitate sending the destination information the other switch(es).

In some embodiments, to avoid having multiple switches in the stack respond to a given forwarding decision (with, potentially, different destination information), only switches which have learned the MAC address on one of its local front ports (i.e., not on a stack port), may respond to such forwarding decisions. Since each MAC address should normally only be learned on one front port in the stack (or one logical front port, in the case of link aggregation), this may ensure that only one switch responds to a forwarding decision. Accordingly, a resolution mechanism may not be required.

As represented by block 430, the switches in the switch stack that receive the destination information may update their respective database(s). For example, the frame processor may extract the destination information and the associated destination address and provide this information to the database manager. The database manager may then use this information to create or modify an entry in the database.

The components that perform the creation and/or distribution of the frames, the forwarding decision information and the destination information and other operations as discussed above may advantageously be implemented in hardware. These components include, for example, the frame processor, the database controller and associated components that may be implemented in the switch. Through the use of techniques such as those described herein, the hardware may reliably maintain consistency within the databases. Accordingly, a fully robust switching system may be provided without many of the drawbacks of a software-based implementation.

Referring now to FIG. 5, an embodiment that utilizes switch identifiers will be considered. Blocks 502, 504 and 506 relate to the process of receiving frames and determining whether there is a match in the database as discussed above in conjunction with blocks 406, 408 and 410.

Block 508 and 510 are similar to blocks 412 and 414 as well. However, when the switch forwards the frame, the switch also may forward an identifier that identifies the switch. For example, the frame processor may access the identifier from a data memory and append this information to the frame via a header. In FIG. 2 the transmission of an identifier ("ID") from switch 202 to switches 204 and 206 is represented in conjunction with the arrows 234 and 232, respectively.

Blocks 512, 514 and 516 relate to the process of receiving previously forwarded frames and determining whether there is a match in the database as discussed above in conjunction with blocks 416, 418 and 420.

Block 518, 520 and 522 are similar to blocks 422, 424 and 426 as well. Again, however, when the switch forwards the frame, the switch also may forward an identifier that accompanies the frame. For example, the frame processor may forward any received identifiers via a header or some other mechanism.

As represented by block 524, the switch determines whether a switch identifier has been received in association with the received frame. As discussed above, the switch identifier may identify the switch that generated the forwarding decision information. As represented by block 526, if an identifier has not been received the switch (e.g., the frame processor) may send the destination information to multiple switches in the switch stack (e.g., flood the destination information).

As represented by block 528, in the event the switch (e.g., switch 204) has received a switch identifier indicative of a switch (e.g., switch 202) that forwarded the frame and an associated indication that the switch 202 did not have an entry in its database for the destination address, the switch 204 may send the information from its database entry (e.g., the destination information) to switch 202 only. For example, the frame processor for switch 204 may extract the switch identifier and use it to generate a frame that is sent to switch 202. In this way, unnecessary traffic relating to sending the destination information to other switches (e.g. switch 206) within the switch stack may be avoided.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

A database as discussed herein may be implemented in a variety of forms. For example, a database may be implemented in a relatively simple data format such as a table, implemented as a formal database, or implemented in some other form. A wide variety of devices and associated code may be used to implement a database. For example, a database may be implemented in data memory, one or more storage drives, or other types of data storage devices.

The components and functions described herein may be connected and/or coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may comprise electrical signals transmitted over a wire, light pulses transmitted through an optical medium such as an optical fiber or air, or RF waves transmitted through a medium such as air, etc. A signal may comprise more than one signal. For example, a signal may consist of a series of signals and/or multiple signals. Thus, a group of signals may be collectively referred to herein as a signal. Signals as discussed herein also may take the form of data. For example, in some embodiments an application program may send a signal to another application program. Such a signal may be stored in a data memory.

In summary, while certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of distributing destination information comprising:

receiving, in a first switch in a switch stack, a frame with information regarding a forwarding decision made by a second switch in the switch stack;

retrieving, by the first switch, destination information relating to the received frame; and wherein the destination information is provided to the second switch when the information regarding the forwarding decision identifies a first destination port for the frame and a different destination port is indicated for the frame by the destination information, and the providing of destination information is done only when the destination information comprises a local front port on the first switch.

2. The method of claim 1 wherein the information regarding the forwarding decision comprises a destination port for the frame.

3. The method of claim 1 wherein the destination information is determined based on the MAC address and virtual LAN identifier of the frame.

4. The method of claim 1 wherein the destination information comprises a destination port for the frame.

5. The method of claim 1 wherein the second switch is identified by an identifier received in conjunction with the frame.

6. The method of claim 5 wherein the forwarding decision comprises an identification of a destination port for the frame.

7. The method of claim 1 wherein the information regarding the forwarding decision is included in a header forwarded with the frame.

\* \* \* \* \*